United States Patent
LeBlanc

(10) Patent No.: US 8,442,198 B2
(45) Date of Patent: May 14, 2013

(54) DISTRIBUTED MULTI-PARTY CONFERENCING SYSTEM

(75) Inventor: Wilf LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 712 days.

(21) Appl. No.: 12/637,215

(22) Filed: Dec. 14, 2009

(65) Prior Publication Data

US 2011/0091029 A1 Apr. 21, 2011

Related U.S. Application Data

(60) Provisional application No. 61/253,378, filed on Oct. 20, 2009.

(51) Int. Cl.
*H04M 3/42* (2006.01)

(52) U.S. Cl.
USPC .................................. 379/202.01; 379/158

(58) Field of Classification Search ............ 379/202.01, 379/201.01, 158, 211.02, 212.01, 207.01; 370/352
See application file for complete search history.

(56) References Cited

U.S. PATENT DOCUMENTS

| | | | |
|---|---|---|---|
| 4,847,829 A | 7/1989 | Tompkins et al. | |
| 6,125,343 A * | 9/2000 | Schuster | 704/201 |
| 6,404,745 B1 | 6/2002 | O'Neil et al. | |
| 6,707,910 B1 * | 3/2004 | Valve et al. | 379/388.06 |
| 6,850,496 B1 | 2/2005 | Knappe et al. | |
| 7,006,455 B1 | 2/2006 | Fandrianto et al. | |
| 7,046,780 B2 | 5/2006 | Kwan | |
| 7,081,915 B1 * | 7/2006 | Hamilton | 348/14.08 |
| 7,200,214 B2 | 4/2007 | Knappe et al. | |
| 7,612,793 B2 * | 11/2009 | Potekhin et al. | 348/14.01 |
| 2004/0003040 A1 | 1/2004 | Beavers et al. | |
| 2005/0114433 A1 * | 5/2005 | Rabipour et al. | 709/201 |
| 2006/0023871 A1 * | 2/2006 | Shaffer et al. | 379/420.01 |
| 2008/0019535 A1 * | 1/2008 | Mitsuhashi et al. | 381/66 |
| 2008/0114606 A1 * | 5/2008 | Ojala et al. | 704/500 |
| 2009/0019112 A1 | 1/2009 | Venner et al. | |
| 2010/0039963 A1 * | 2/2010 | Nagle et al. | 370/260 |

OTHER PUBLICATIONS

"Introduction: Enhance Productivity with Virtual Meetings", Cisco Unified MeetingPlace, UC8 Overview CIS-101372, Collaborate Anywhere, Anytime, http://www.cisco.com/en/US/products/sw/ps5664/ps5669/index.html, dated Nov. 29, 2009, 2 pages.
A Guide to Multipoint Conferencing, ClearOne Communications, Inc., (2002), 12 pages.
Castle, "IP Telephony Pocket Guide", 2nd Edition, ShoreTel, Inc., (Sep. 2004), 89 pages.

* cited by examiner

*Primary Examiner* — William Deane, Jr.
(74) *Attorney, Agent, or Firm* — Fiala & Weaver P.L.L.C.

(57) ABSTRACT

Techniques for multi-party conferencing are provided. A plurality of audio streams is received from a plurality of conference-enabled devices associated with a conference call. Each audio stream includes a corresponding encoded audio signal generated based on sound received at the corresponding conference-enabled device. Two or more of the audio streams are selected based upon an audio characteristic (e.g., a loudness of a person speaking). The selected audio streams are transmitted to each conference-enabled device associated with the conference call. At each conference-enabled device, the selected audio streams are decoded into a plurality of decoded audio streams, the decoded audio streams are combined into a combined audio signal, and the combined audio signal is played from one or more loudspeakers to be listened to by a user.

21 Claims, 9 Drawing Sheets

800

802
decode each audio stream of the plurality of audio streams into a corresponding decoded audio signal to form a plurality of decoded audio signals 804
analyze each decoded audio signal of the plurality of decoded audio signals based upon the audio characteristic to select the two or more audio streams of the plurality of audio streams

DISTRIBUTED MULTI-PARTY CONFERENCING SYSTEM

This application claims the benefit of U.S. Provisional Application No. 61/253,378, filed on Oct. 20, 2009, which is incorporated by reference herein in its entirety.

BACKGROUND OF THE INVENTION

1. Field of the Invention

The present invention relates to multi-party conferencing systems.

2. Background Art

A teleconference is the live exchange of information among remotely located devices that are linked by a telecommunications system. Examples of devices that may exchange information during a teleconference include telephones and/or computers. Such conferencing devices may be linked together by a telecommunications system that includes one or more of a telephone network and/or a wide area network such as the Internet. Teleconferencing systems enable audio data, video data, and/or documents to be shared among any number of persons/parties. A teleconference that includes the live exchange of voice communications between participants may be referred to as a "conference call."

In a large multi-party conference call, multiple conference participants may dial into a central server/switch. The central server/switch typically aggregates the audio that is received from the participants, such as by adding the audio together in some manner (e.g., possibly in a non-linear fashion), and redistributes the audio back to the participants. For instance, this may include the central server choosing the loudest 3 or 4 talkers out of all of the participants, summing the audio associated with the loudest talkers, and transmitting the summed audio back to each of the participant conferencing devices.

In the case of conferences performed over IP (Internet protocol) networks, such server-managed conferences may provide poor audio quality for a number of reasons. For example, in such teleconferencing systems, audio data is encoded at each conferencing device and is decoded at the server. The server selects and sums together some of the received audio to be transmitted back to the conferencing devices. Encoding is again performed at the server to encode the summed audio, and the encoded summed audio is decoded at each conferencing device. Due to this "voice coder tandeming," where multiple encoding-decoding cycles are performed on the audio data, the conference audio quality may be degraded. Furthermore, the non-linear mixing/selection of the loudest talkers may reduce the conference audio quality. Still further, the difference in volume of audio included in the different audio streams received from the various conferencing devices (e.g., due to quiet talkers sitting far from microphones, and loud talkers sitting close to microphones) can lead to even further reduction in conference audio quality.

As such, the central server (e.g., a single multi-core PC) can become overloaded with the decoding operations performed on each of the received participant audio streams, the re-encoding operation used to encode the summed audio, and further audio processing operations that may be performed, such as automatic gain control (e.g., used to equalize volumes of the different received audio streams). As such, improved techniques for multi-party conferencing are desired that are less complex and provide higher conference audio quality.

BRIEF SUMMARY OF THE INVENTION

Methods, systems, and apparatuses are described for multi-party conferencing, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
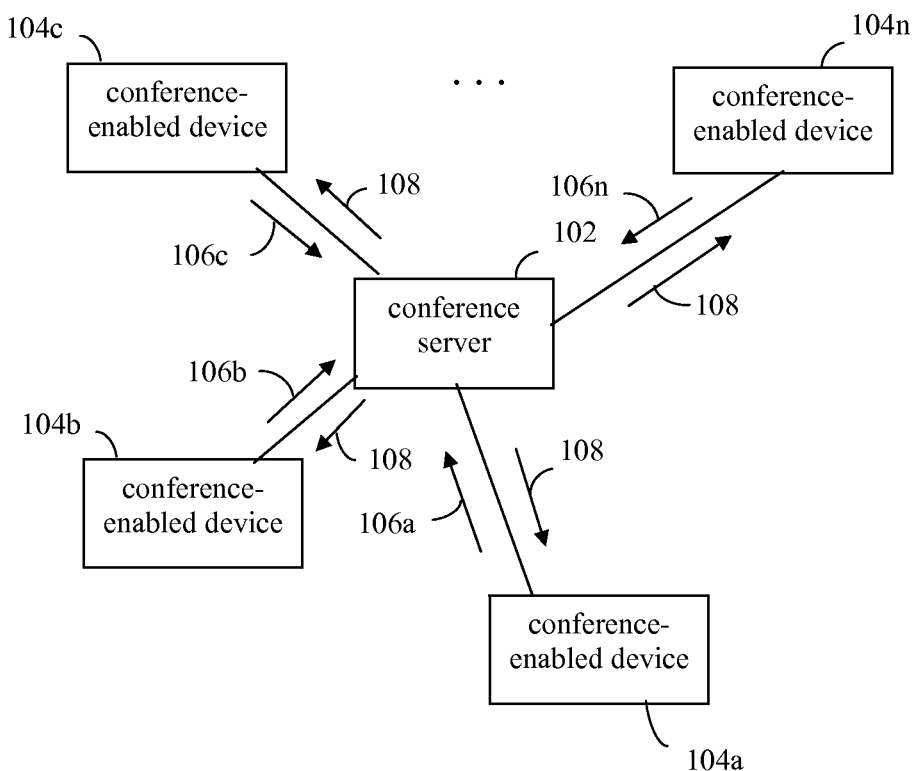
FIG. 1 shows a block diagram of an example multi-party conferencing system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Conferencing Systems

Embodiments of the present invention may be implemented in teleconferencing systems to enable multiple parties to share information in a live manner, including participant voice information. For instance, FIG. 1 shows a block diagram of an example multi-party conferencing system 100. As shown in FIG. 1, system 100 includes a conference server 102 and a plurality of conference-enabled devices 104a-104n (e.g., "participant devices").

One or more users may be present at each of conference-enabled devices 104a-104n, and may use the corresponding conference-enabled device 104 to participate in a multi-party conference call. For example, the users may speak/talk into one or more microphones at each conference-enabled device 104 to share audio information in the conference call. As shown in FIG. 1, each of conference-enabled devices 104a-104n may generate a corresponding one of audio streams 106a-106n (e.g., streams of audio data packets). Each audio stream 106 includes audio data generated based on sound (e.g., voice from talkers, etc.) captured at the corresponding conference-enabled device 104. Each of audio streams 106a-106n is received at conference server 102. At any particular moment, conference server 102 is configured to select a number of audio streams 106a-106n to be transmitted back to each of conference-enabled devices 104a-104n as the shared conference audio. Typically, the audio streams that are selected by conference server 102 to be shared include captured voice of the talkers in the conference call that are determined to be the loudest talkers at the particular time.

For example, in FIG. 1, conference server 102 may have selected audio streams 106a, 106c, 106d, and 106f to be transmitted to conference-enabled devices 104a-104n as shared audio. As such, conference server 102 may generate a shared audio stream 108, which includes an aggregation (e.g., an adding) of audio streams 106a, 106c, 106d, and 106f. As shown in FIG. 1, shared audio stream 108 is transmitted to each of conference-enabled devices 104a-104n. Each of conference-enabled devices 104a-104n may play the audio associated with audio stream 108 so that the associated users can hear the audio of the conference call selected for sharing.

Note that conference server 102 may transmit the same shared audio stream 108 to all of conference-enabled devices 104a-104n, or generate a shared audio stream specific to some of conference-enabled device 104a-104n. For instance, conference server 102 may generate specific shared audio streams for each conference-enable device 104 having an audio stream 106 selected to be included in shared audio stream 108 that does not include the conference-enabled device's own audio stream 106. In this manner, those conference-enabled devices 104 do not receive their own audio. For instance, in the above example, conference server 102 may generate a shared audio stream specific to each of conference-enabled devices 104a, 104c, 104d, and 104f. Audio streams 106c, 106d, and 106f may be transmitted to conference-enabled device 104a, but audio stream 106a is not transmitted to conference-enabled device 104a, because conference-enabled device 104a does not need to receive its own generated audio stream 106a. Likewise, audio stream 106c may not be transmitted back to conference-enabled device 104c, audio stream 106d may not be transmitted back to conference-enabled device 104d, and audio stream 106f may not be transmitted back to conference-enabled device 104f.

Figure 2:
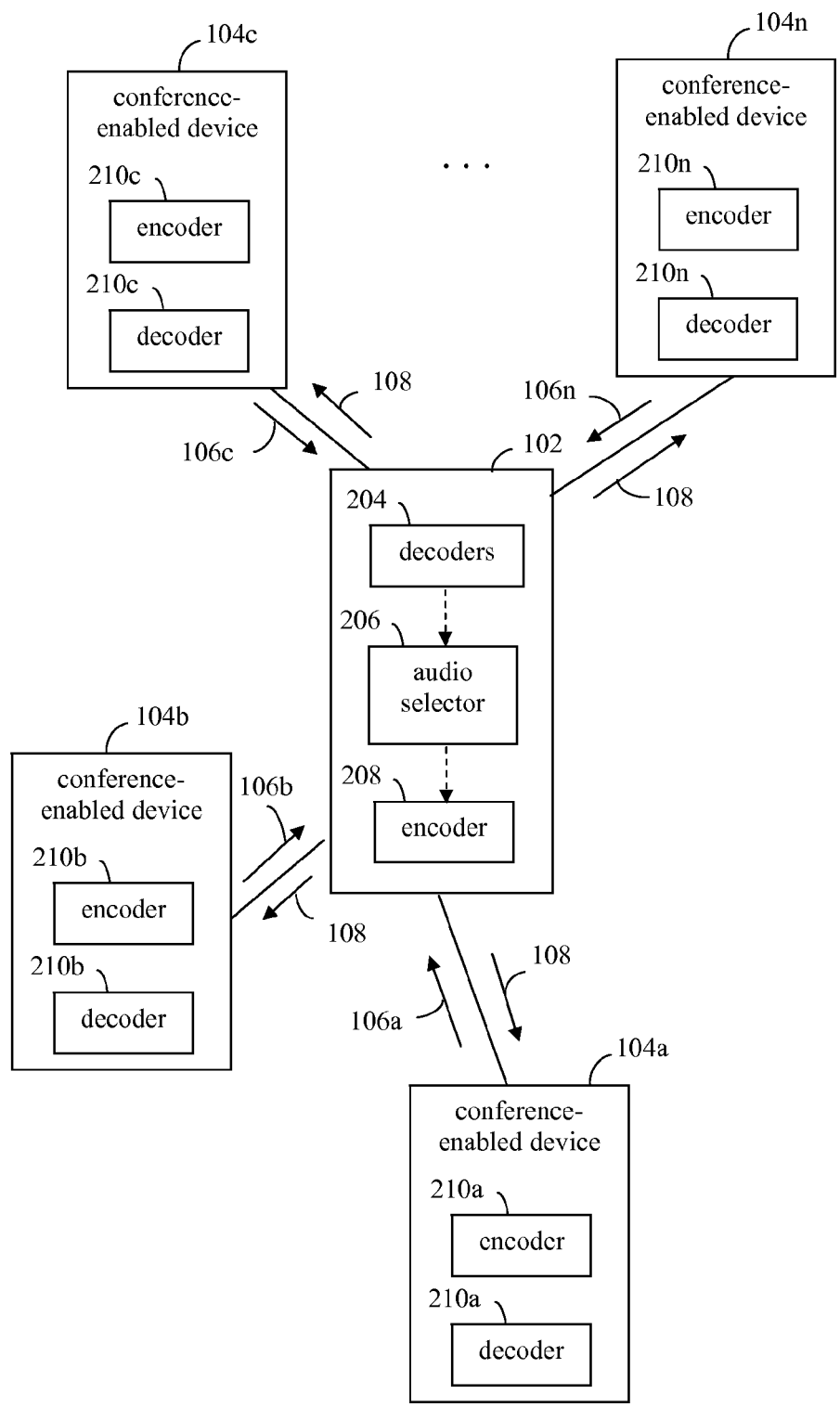
FIG. 2 shows a block diagram of the multi-party conferencing system of FIG. 1.

In the case of conferences performed over IP (Internet protocol) networks, server-managed conferencing systems, such as system 100 of FIG. 1, may provide poor audio quality. For instance, FIG. 2 shows a block diagram of multi-party conferencing system 100, with further detail. In system 100, each of conference-enabled devices 104a-104n includes a corresponding one of encoders 202a-202n and a corresponding one of decoders 210a-210n. Furthermore, conferencing server 102 includes decoders 204, an audio selector 206, and an encoder 208. Each of conference-enabled devices 102 captures sound (e.g., with a microphone) to generate an audio signal, which is encoded by the corresponding encoder 202, to generate the corresponding audio stream 106. Conference server 102 receives and decodes each of received audio streams 106a-106n with decoders 204. Audio selector 206 receives the decoded versions of audio streams 106a-106n, and selects which of audio streams 106a-106n to provide as shared audio (e.g., audio streams 106a, 106c, 106d, and 106f, in the current example). Encoder 208 combines and encodes the selected audio streams into shared audio stream 108, which is transmitted to each of conference-enabled devices 104a-104n, as described above. Decoders 210a-210n decode shared audio stream 108 at each of conference-enabled devices 104a-104n.

According to this conventional technique, a combined audio stream is generated to be transmitted from conference server 102 to all conference-enabled devices 104a-104n. However, in this situation, each audio stream 106 is encoded at its source conference-enabled device 104, decoded at conference server 102, encoded into shared audio stream 108 at conference server 102, and shared audio stream 108 is decoded (to be played) at each of conference-enabled devices 104a-104n. This results in an encode-decode-encode-decode configuration, which is referred to as voice coder tandeming. Such a configuration may require higher quality (e.g., additional bit resolution) encoding to be performed at conference-enabled devices 104a-104n in an attempt to preserve audio signal quality, as greater audio signal degradation occurs with each repeated cycles of encoding and decoding. For example, encoders 202a-202n may each be configured to encode audio according to a higher bit rate audio data compression algorithm (e.g., G.726, which enables a bit rate of 32 kb/s), to enable a greater degree of audio quality to be preserved, rather than encoding audio according to a less resource intensive lower bit rate compression algorithm (e.g., G.729, at 8 kb/s).

Furthermore, audio quality may suffer in conventional conferencing server implementations due to the non-linear mixing/selection of the loudest talkers, due to the difference in volume of talkers participating in a conference call (e.g., quiet talkers sitting far from microphones, loud talkers sitting close to microphones, etc.), due to an overloading of the conferencing server with the decoding operations performed on each of the received participant audio streams, due to automatic gain control operations, etc.

III. Example Embodiments

In embodiments, decoding operations related to multi-party conferencing are performed at participant endpoints (conference-enabled devices). By performing decoding operations at the endpoints rather than at a central switch/server, audio quality may be improved, and system complexity may be reduced. In an embodiment, instead of decoding all audio data packets at the central switch/server, decoding of the audio data packets is performed at the participant endpoints. In another embodiment, instead of fully decoding audio data packets at the central switch/server, a partial decoding of the audio data packets may be performed at the central switch/server to extract audio level and/or enough spectral information to make a loudness and/or voice activity detection. In such an embodiment, the central switch/server may select which audio data streams (e.g., three or four of the audio streams) received from the participant devices to forward/transmit to the participant endpoints, and each participant endpoint may receive and fully decode the received selected audio streams.

In an embodiment, participant endpoints are enabled to spatially render the received audio streams. Each audio stream may include location information corresponding to the participant endpoint that generated the audio stream, and the location information may be used to spatially render audio. The location information may include one or more items of information, such as the IP address and UDP port used to carry RTP (Real-time Transport Protocol) traffic. For example, audio associated with a first conference-enabled device located in a first location (e.g., Irvine, Calif.) may be rendered as the left channel (or left side) audio, and audio associated with a second conference-enabled device located in a second location (e.g., San Jose, Calif.) may be rendered as the right channel (or right side) audio. By rendering the different audio streams spatially, listeners at the participant devices may be able to more quickly identify which particular participant user is talking at any particular time.

Figure 3:
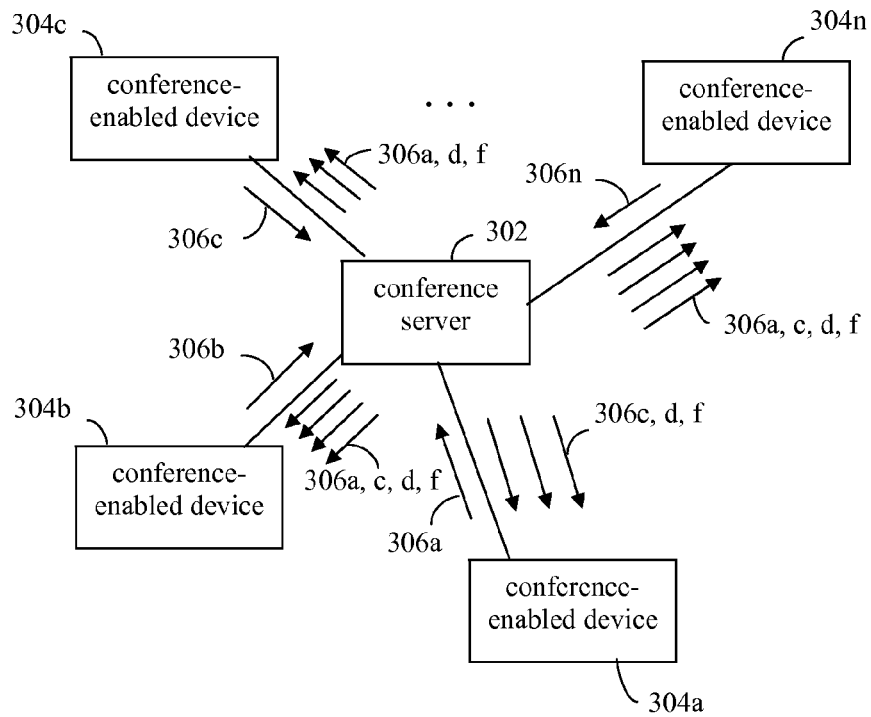
FIG. 3 shows a block diagram of an example multi-party conferencing system, according to an example embodiment.

FIG. 3 shows a block diagram of an example multi-party conferencing system 300, according to an embodiment. As shown in FIG. 3, system 300 includes a conference server 302 and a plurality of conference-enabled devices 304a-304n (e.g., "participant devices" or "endpoints"). Conference-enabled devices 304 may be any type of devices that enable users to participate in multi-party conferences, including IP (Internet protocol) telephones, computer systems, video game consoles, set-top boxes, etc. Each of conference-enabled devices 304 may be a same device type, or may be different devices. Any number of conference-enabled devices 304 may be present.

One or more users may be present at each of conference-enabled devices 304a-304n, and may use the corresponding conference-enabled device 304 to participate in a multi-party conference call. For example, the users may speak/talk into one or more microphones coupled to each conference-enabled device 304 to share audio information in a conference call in which the users participate. As shown in FIG. 3, each of conference-enabled devices 304a-304n may generate a corresponding one of audio streams 306a-306n (e.g., streams of audio data packets). Each audio stream 306 includes audio data generated based on sound (e.g., voice from talkers, etc.) captured at the corresponding conference-enabled device 304. Each of audio streams 306a-306n is received at conference server 302. At any particular moment, conference server 302 is configured to select a number of audio streams 306a-306n to be forwarded/transmitted back to each of conference-enabled devices 304a-304n as the shared conference audio. For example, conference server 302 may select two or more of audio streams 306a-306 that include the loudest captured voice of the talkers in the conference to be shared. As shown in FIG. 3, conference server 302 transmits the selected audio streams (e.g., audio streams 306a, 306c, 306d, and 306f) to each of conference-enabled devices 304a-304n (except for each conference device's own audio stream). Rather than conference server 302 combining the audio streams, each conference-enabled device 304 combines the received audio streams, and enables the combined audio streams to be played to the associated users (e.g., through one or more loudspeakers).

System 300 of FIG. 3 does not suffer from deficiencies of conventional conferencing systems. As described above, conventional multi-party conferencing are very complex. For instance, a conventional conferencing server typically is very complex at least due to the decoding and encoding operations that are performed in real time. Furthermore, conventional conference call quality may be poor due to reduced audio processing and a lack of audio spatialization. In system 300, the requirement for transcoding (decoding and encoding) audio streams is removed from the conferencing switch/server, enabling conferencing quality to increase and complexity to decrease. In system 300, additional processing is performed at the conferencing endpoints (conference-enabled devices 304a-304n) relative to conventional conferencing endpoints, but devices that may be used as conferencing endpoints typically contain more than sufficient processing capability (e.g., a GHz of more of processing power is typically present in endpoints such as computers or IP telephones). Furthermore, system 300 tends to scale better than conventional conferencing systems.

In system 300, voice coder tandeming does not occur, because each audio stream 306 is encoded at its source conference-enabled device 304, and is decoded (to be played) at each of conference-enabled devices 304a-304n (no intermediate decoding-encoding is performed). As such, higher quality (e.g., additional bit resolution) encoding is not required at conference-enabled devices 304a-304n because voice coder tandeming is not present. Furthermore, because separate audio streams are received at conference-enabled devices 304a-304n, location information may be provided for each audio stream to enable spatial audio to be rendered at conference-enabled devices 304a-304n. Such spatial rendering of audio may not be possible in a conventional system, where selected audio streams have already been combined and thus cannot be separately rendered.

System 300 and further embodiments are described in additional detail below. The next subsection describes example embodiments for encoding audio at participant devices and for selecting audio streams at the conference server. A subsequent subsection describes example embodiments for processing and combining the selected audio streams at the participant devices.

A. Example Audio Encoding and Conference Server Embodiments

Figure 4:
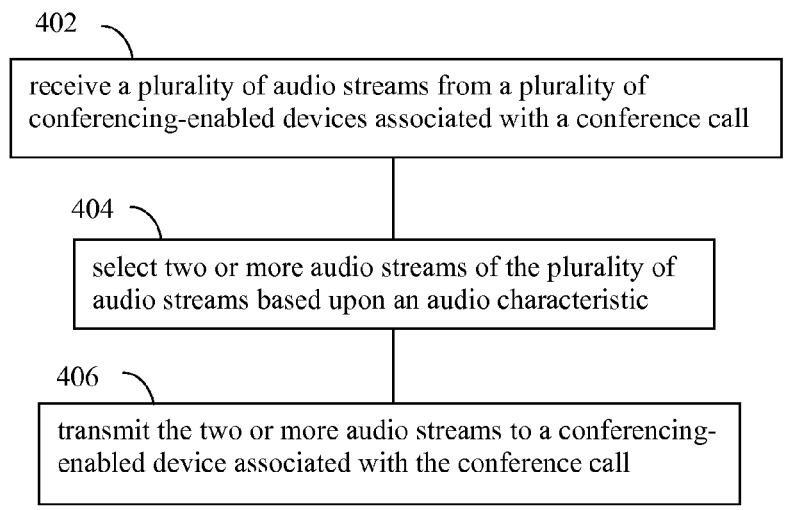
FIG. 4 shows a flowchart providing a process for managing a multi-party conference call, according to an example embodiment.
Figure 5:
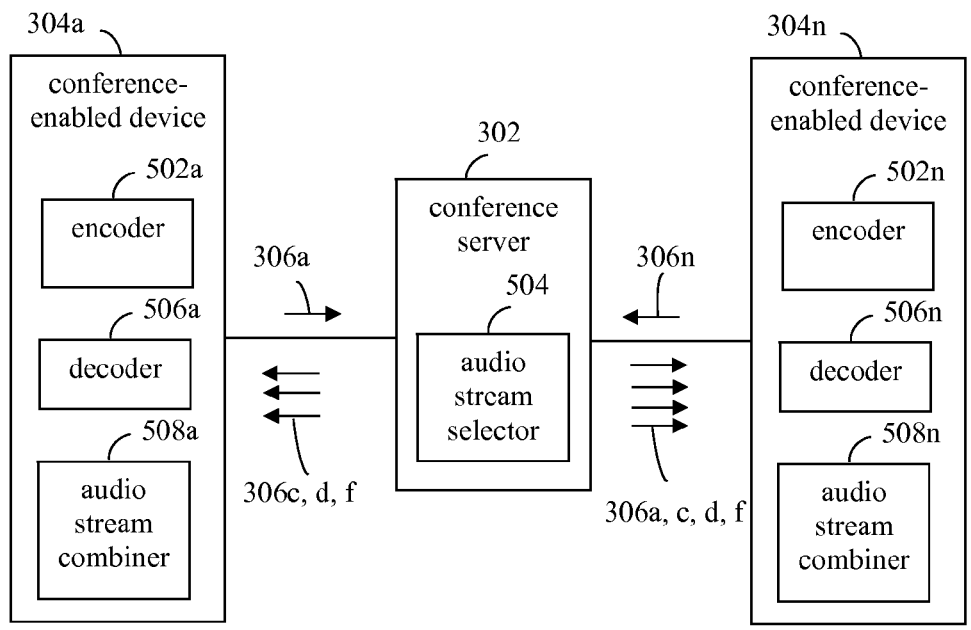
FIG. 5 shows a block diagram of a portion of the conferencing system of FIG. 3, according to an example embodiment.

Example embodiments of audio encoding at conference-enabled devices 304, and embodiments for conference server 302 are described in this subsection. For instance, FIG. 4 shows a flowchart 400 providing a process for managing a multi-party conference call, according to an example embodiment. Conference server 302 of FIG. 3 may perform flowchart 400, in an embodiment. Flowchart 400 is described below with reference to FIG. 5, for illustrative purposes. FIG. 5 shows a block diagram of a portion of system 300 of FIG. 3, according to an example embodiment. In FIG. 5, conference-enabled devices 304a and 304n and conference server 302 are shown. In the embodiment of FIG. 5, conference-enabled device 304a includes an encoder 502a, a decoder 506a, and an audio stream combiner 508a, conference server 302 includes an audio stream selector 504, and conference-enabled device 304n includes an encoder 502n, a decoder 506n, and an audio stream combiner 508n. Further conference-enabled devices 304, and their respective encoders 502, decoders 506, and audio stream combiners 508 are not shown in FIG. 5, for ease of illustration. Other structural and operational embodiments will be apparent to persons skilled in the relevant art(s) based on the discussion regarding flowchart 400. Flowchart 400 is described as follows.

Flowchart 400 begins with step 402. In step 402, a plurality of audio streams is received from a plurality of conference-enabled devices associated with a conference call. For instance, as shown in FIG. 3, each of conference-enabled devices 304a-304n may generate a corresponding one of audio streams 306a-306n. Each audio stream 306 includes audio data generated based on sound (e.g., voice from talkers, etc.) captured at the corresponding conference-enabled device 304. Sound may be captured (e.g., by one or more microphones) and converted into an electrical audio signal at each conference-enabled device 304, and is encoded to generate a respective audio stream 306. For example, referring to FIG. 5, conference-enabled device 304a encodes a local audio signal (generated from locally captured sound) using encoder 502a to generate audio stream 306a. Likewise, conference-enabled device 304n encodes a local audio signal using encoder 502n to generate audio stream 306n. Encoders 502 may be configured to perform compression according to any suitable type of algorithm or audio codec, including being configured to perform compression according to one or more of the ITU (International Telecommunication Union) standard voice compression algorithms, such as G.722, G.726, G.729, etc. In FIGS. 3 and 5, each of audio streams 306a-306n is received at conference server 302.

In step 404, two or more audio streams of the plurality of audio streams are selected based upon an audio characteristic. As described above with reference to FIG. 3, conference server 302 is configured to select a number of audio streams 306a-306n to be transmitted back to each of conference-enabled devices 304a-304n as the shared conference audio. For instance, as shown in FIG. 5, audio stream selector 504 of conference server 302 may be configured to perform the selection based on one or more audio characteristics of audio streams 306a-306n, such as a loudness/amplitude of included audio (e.g., select the loudest talkers), noise characteristics (e.g., select audio streams with least noise), clarity (e.g., select audio streams that are most clear), etc.

Figure 6:
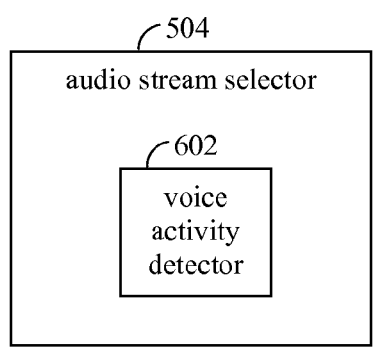
FIG. 6 shows a block diagram of an audio stream selector, according to an example embodiment.

For instance, FIG. 6 shows a block diagram of audio stream selector 504, according to an example embodiment. As shown in FIG. 6, audio stream selector 504 includes a voice activity detector 602. Voice activity detector 602 may be configured to determine one or more of audio streams 306a-306n that have voice activity (e.g., have voice frequencies with amplitudes greater than a predetermined threshold level, etc.), indicating that one or more persons are talking. Voice activity detector 602 may be configured to select the one or more of audio streams 306a-306n that have active talkers to be the shared audio stream(s) selected to be transmitted to conference-enabled devices 304a-304n. Alternatively, voice activity detector 602 and/or audio stream selector 504 may perform further selection on the audio streams 306a-306n determined to have active talkers based on further audio characteristics (e.g., loudness, noise, etc.) to narrow down a number of audio streams selected to be transmitted to conference-enabled devices 304a-304n.

In one embodiment, conference server 302 receives audio streams 306a-306n and performs the selection without decoding audio streams 306a-306n. In another embodiment, conference server 302 receives and decodes audio streams 306a-306n, partially or fully, and performs the selection based on the partially or fully decoded audio streams 306a-306n. In either case, encoding of audio streams 306a-306n into a combined audio stream at conference server 302 is not required.

Figures 7, 8:
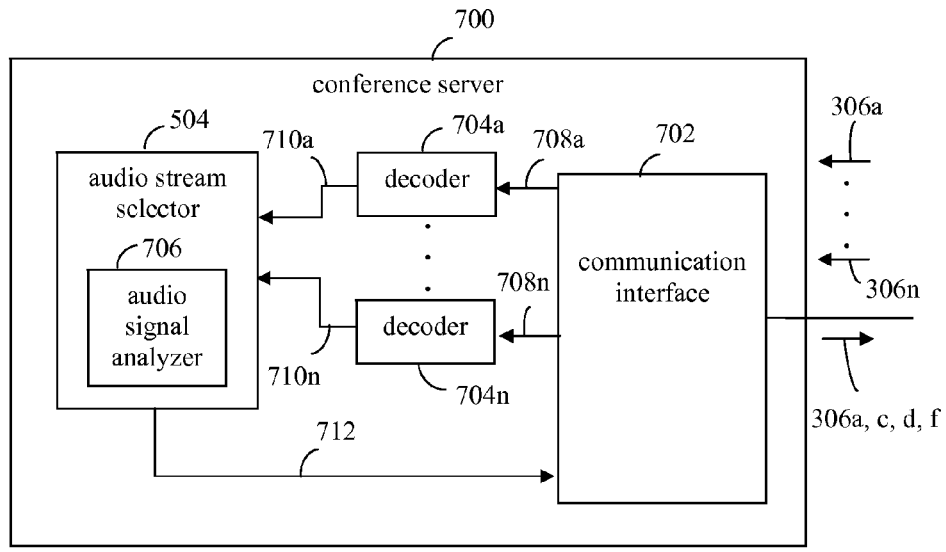
FIG. 7 shows a block diagram of a conference server, according to an example embodiment.
FIG. 8 shows a flowchart providing a process for selecting audio streams for sharing in a conference call, according to an example embodiment.

Conference server 302 may be configured in various ways. For instance, FIG. 7 shows a block diagram of a conference server 700, according to an example embodiment. Conference server 700 in FIG. 7 is an example of conference server 302, and is configured to perform partial or full decoding of audio streams 306a-306n to select audio streams for sharing. As shown in FIG. 7, conference server 700 includes a communication interface 702, a plurality of decoders 704a-704n, and audio stream selector 504. Conference server 700 is described as follows.

As shown in FIG. 7, communication interface 702 receives audio streams 306a-306n and outputs received audio streams 708a-708n. Audio streams 708a-708n each include the audio data received in a corresponding one of audio streams 306a-306n. Communication interface 702 enables conference server 700 to communicate over a network (e.g., a local area network (LAN), a wide area network (WAN), or a combination of communication networks, such as the Internet) in order to communicate with conference-enabled devices 304a-304n. Communication interface 702 may be any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc.

Decoders 704a-704n each receive a corresponding one of audio streams 708a-708n. In an embodiment, decoders 704a-704n may perform a step 802 shown in a flowchart 800 in FIG. 8. In step 802, each audio stream of the plurality of audio streams is decoded into a corresponding decoded audio signal to form a plurality of decoded audio signals. As shown in FIG. 7, each of decoders 704a-704n is configured to decode a corresponding one of audio streams 708a-708n to generate decoded audio signals 710a-710n. Each decoder 704 may be configured to perform decompression according to any suitable type of decompression algorithm or audio codec, including being configured to perform decompression according one or more of the ITU standards, such as G.722, G.726, G.729, etc.

In an embodiment, decoders 704a-704n may be configured to fully decode audio streams 708a-708n. In such an embodiment, decoded audio signals 710a-710n are fully decoded audio signals. In another embodiment, decoders 704a-704n may be configured to partially decode audio streams 708a-708n. In such an embodiment, decoded audio signals 710a-710n are partially decoded audio signals. For instance, it may desired to partially decode audio streams 708a-708n to the extent needed to extract information used to select audio streams for forwarding, without decoding further portions of audio streams 708a-708n that are not necessary for the selection process. For example, in an embodiment, decoders 704a-704n may be configured to decode header portions of audio data packets of audio streams 708a-708n, and/or other portions of the audio data packets of audio streams 708a-708n, without fully decoding the body portions of the audio data packets. The header portions (or other portions) of the audio data packets may include loudness and/or other information that is used to select audio streams for sharing. By partially decoding rather than fully decoding audio streams 708a-708n, the complexity of conference server 700 may be reduced relative to conventional conferencing servers.

Note that in an embodiment, as shown in FIG. 7, multiple decoders 702a-704n may be present in conferencing server 700 to partially or fully decode audio streams 708a-708n to generate audio signals 710a-710n. In another embodiment, a single decoder 702 may be present in conferencing server 700 to partially or fully decode audio streams 708a-708n to generate audio signals 710a-710n. For example, the single decoder 702 may decode audio streams 708a-708n in a serial, interleaved, and/or other manner, in embodiments.

As shown in FIG. 7, audio stream selector 504 receives decoded audio signals 710a-710n. Audio stream selector 504 may be configured to select two or more of decoded audio signals 710a-710n in various ways, including by analyzing data packet header (and/or other data packet portion) information extracted by decoders 704a-704n.

For instance, as shown in FIG. 7, audio stream selector 504 may include an audio signal analyzer 706. Audio stream selector 504 may be configured to perform step 804 of flowchart 800 in FIG. 8. In step 804, each decoded audio signal of the plurality of decoded audio signals is analyzed based upon the audio characteristic to select the two or more audio streams of the plurality of audio streams. Audio signal analyzer 706 may be configured to analyze audio data packets of decoded audio signals 710a-710n based on one or more audio characteristics (e.g., loudness, noise, clarity, etc.), as described above, to select one or more of audio streams 306a-306n to be forwarded. Audio signal analyzer 706 may be configured to perform spectral analysis on decoded audio signals 710a-710n, for example. In an embodiment, audio signal analyzer 706 may be present to analyze audio signals 710a-710n when decoders 704a-704n fully decode audio streams 708a-708n to generate audio signals 710a-710n, or when partial decoding by decoders 704a-704n leaves sufficient audio data in audio signals 710a-710n for analysis.

As shown in FIG. 7, audio stream selector 504 generates a selected audio stream indicator 712, which indicates the two or more of audio streams 306a-306n selected to be shared. Selected audio stream indicator 712 is received by communication interface 702.

In step 406, the two or more audio streams are transmitted to a conference-enabled device associated with the conference call. For example, as shown in FIG. 5, communication interface 702 of conference server 700 transmits the selected audio streams (e.g., audio streams 306a, 306c, 306d, and 306f) indicated by selected audio stream indicator 712 to each of conference-enabled devices 304a-304n. In one embodiment, each of the selected audio streams is transmitted to each of conference-enabled devices 304a-304n. In another embodiment, each of the selected audio streams is transmitted to each of conference-enabled devices 304a-304n, except that a conference-enabled device's own audio stream is not transmitted to the conference-enabled device. As described in further detail in the following subsection, each conference-enabled device 304 receives and combines the audio streams, and enables the combined audio streams to be played to the associated users (e.g., through one or more loudspeakers).

B. Example Audio Stream Processing and Combining Embodiments

Figure 9:
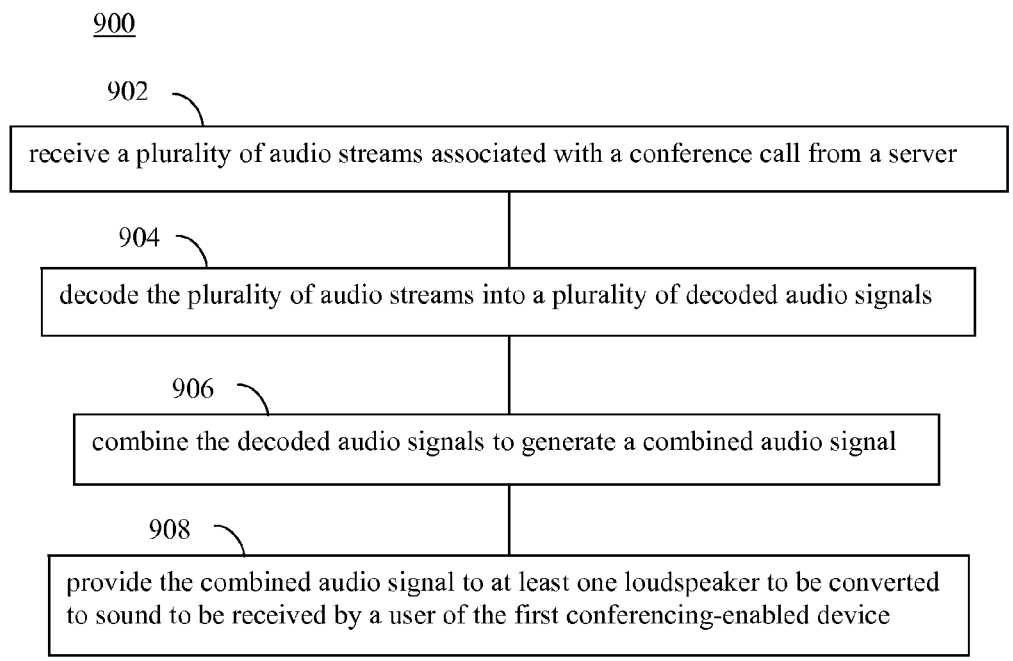
FIG. 9 shows a flowchart providing a process for combining audio streams of a conference call at a participant device, according to an example embodiment.
Figure 10:
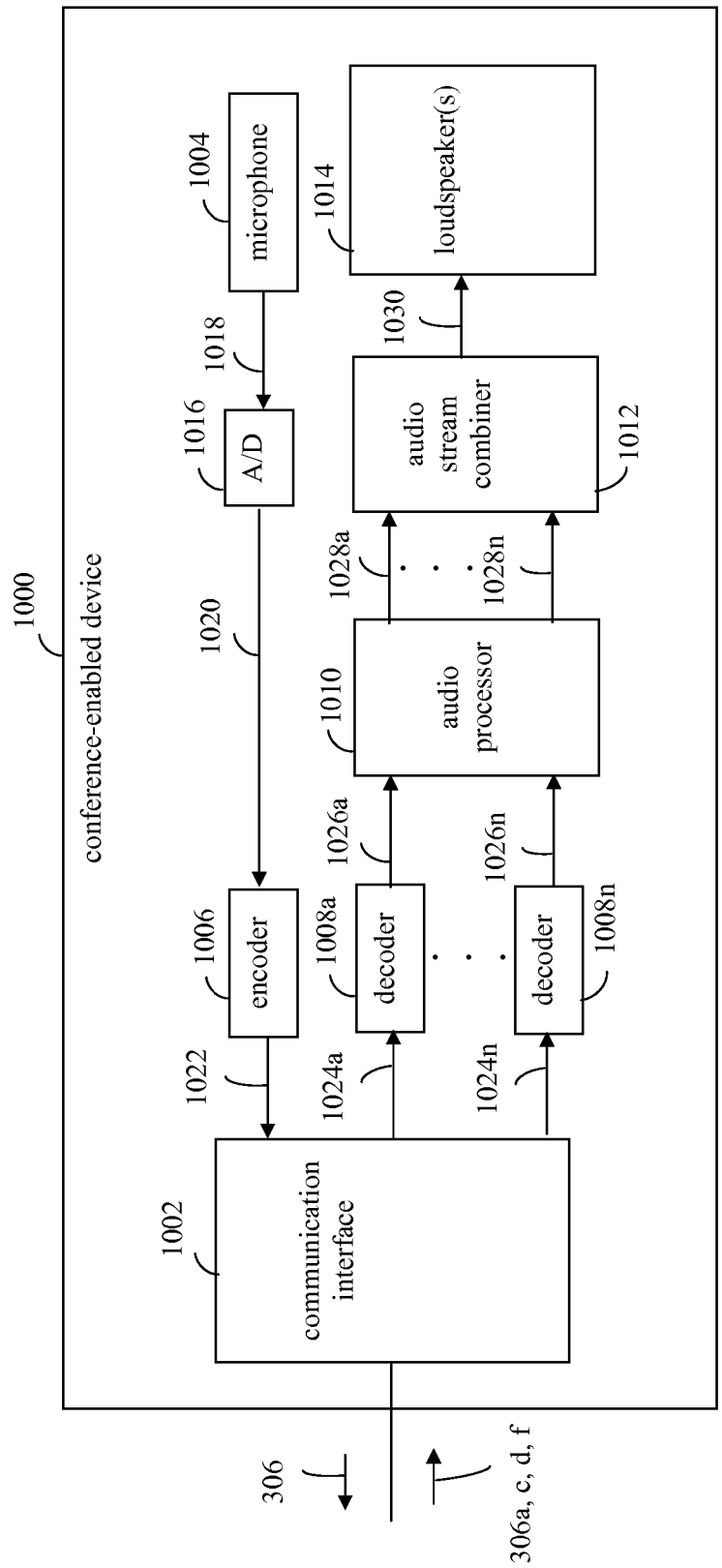
FIG. 10 shows a block diagram of an example conference-enabled device, according to an embodiment.

Example embodiments of audio stream processing and combining at conference-enabled devices 304 are described in this subsection. For instance, FIG. 9 shows a flowchart 900 providing a process for combining audio streams of a conference call at a participant device, according to an example embodiment. For example, in an embodiment, each of conference-enabled devices 304a-304n of FIG. 3 may perform flowchart 900. Flowchart 900 is described below with reference to FIG. 10, for illustrative purposes. FIG. 10 shows a block diagram of an example conference-enabled device 1000, according to an embodiment. Conference-enabled device 1000 is an example of a conferencing-enabled device 304. As shown in FIG. 10, conference-enabled device 1000 includes a communication interface 1002, a microphone 1004, an encoder 1006, a plurality of decoders 1008a-1008n, an audio processor 1010, an audio stream combiner 1012, one or more loudspeakers 1014, and an analog-to-digital (A/D) converter 1016. Other structural and operational embodiments will be apparent to persons skilled in the relevant art(s) based on the discussion regarding flowchart 900. Flowchart 900 and conference-enabled device 1000 are described below.

As shown in FIG. 10, one or more microphones 1004, A/D converter 1016, and encoder 1006 of conference-enabled device 1000 may generate an audio stream 306 corresponding to conference-enabled device 1000. Microphone 1004 receives sound, including voice from one or more users of conference-enabled device 1000 that are participating in a conference call. Microphone 1004 generates a microphone signal 1018 from the received sound. A/D converter 1016 receives microphone signal 1018, and converts microphone signal 1018 from analog to digital form, to generate a digital audio signal 1020. Encoder 1006 receives digital audio signal 1020. Encoder 1006 is an example of encoders 502a-502n described with reference to FIG. 5. Encoder 1006 is configured to encode digital audio signal 1020 to generate audio stream 1022, which is transmitted from conference-enabled device 1000 by communication interface 1002 as audio stream 306.

Flowchart 900 of FIG. 9 begins with step 902. In step 902, a plurality of audio streams associated with a conference call is received from a server. For example, as shown in FIG. 3, conference server 302 transmits the selected audio streams (e.g., audio streams 306a, 306c, 306d, and 306f) to each of conference-enabled devices 304a-304n. Referring to FIG. 10, conference-enabled device 1000 (e.g., one of conference-enabled devices 304a-304n) receives the selected audio streams, which in the example of FIG. 10 are audio streams 306a, 306c, 306d, and 306f. As shown in FIG. 10, communication interface 1002 receives selected audio streams 306a, 306c, 306d, and 306f and outputs received audio streams 1024a, 1024c, 1024d, and 1024f. Audio streams 1024a, 1024c, 1024d, and 1024f each include the audio data received in a corresponding one of audio streams 306a, 306c, 306d, and 306f. Note that any number of selected audio streams 306 may be received, depending on the number of audio streams selected to be forwarded at any particular moment by conference server 302.

Communication interface 1002 enables conference-enabled device 1000 to communicate over a network (e.g., a local area network (LAN), a wide area network (WAN), or a combination of communication networks, such as the Internet) to communicate with conference server 302. Communication interface 1002 may be any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc.

In step 904, the plurality of audio streams is decoded into a plurality of decoded audio signals. In FIG. 10, decoders 1008a-1008n are present to decode the received audio streams that were selected by conference server 302. In the current example, decoders 1008a-1008d each receive a corresponding one of audio streams 1024a, 1024c, 1024d, and 1024f. Decoders 1008a-1008d are configured to decode a corresponding one of audio streams 1024a, 1024c, 1024d, and 1024f to generate decoded audio signals 1026a, 1026c, 1026d, and 1026f. Each decoder 704 may be configured to perform decompression according to any suitable type of decompression algorithm or audio codec, including being configured to perform decompression according one or more of the ITU standards, such as G.722, G.726, G.729, etc.

In an embodiment, as shown in FIG. 10, multiple decoders 1008a-1008n may be present in conference-enabled device 1000 to decode audio streams 1024a-1024n to generate decoded audio signals 1026a-1026n. In another embodiment, a single decoder 1008 may be present in conference-enabled device 1000 to decode audio streams 1024a-1024n to generate decoded audio signals 1026a-1026n. The single decoder 1008 may decode audio streams in a serial, interleaved, or other manner, in embodiments.

Figure 11:
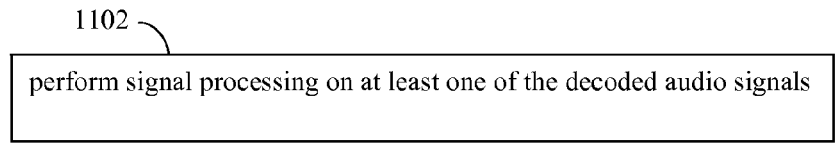
FIG. 11 shows a process for processing audio signals, according to an example embodiment.

Audio processor 1010 may be optionally present in conference-enabled device 1000 to perform processing on the decoded audio signals. For instance, in an embodiment, audio processor 1010 may perform step 1102 shown in FIG. 11. In step 1102, signal processing is performed on at least one of the decoded audio signals. As shown in FIG. 10, audio processor 1010 receives decoded audio signals 1026a-1026n, and generates processed audio signals 1028a-1028n. In the current example, audio processor 1010 may receive decoded audio signals 1026a, 1026c, 1026d, and 1026f, and may generate processed audio signals 1028a, 1028c, 1028d, and 1028f. Audio processor 1010 may be an audio processor (e.g., a digital signal processor (DSP)) and/or may be implemented in another type of processor or device(s). Audio processor 1010 may be configured to perform one or more of a variety of audio processing functions on the decoded audio signals, including audio amplification, filtering, equalization, etc.

Figure 12:
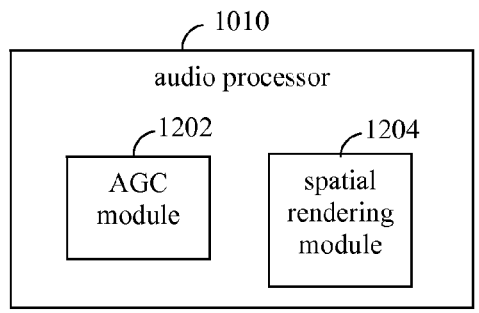
FIG. 12 shows a block diagram of an audio processor, according to an example embodiment.

For instance, FIG. 12 shows a block diagram of audio processor 1010, according to an example embodiment. As shown in FIG. 12, audio processor 1010 includes an AGC (automatic gain control) module 1202 and a spatial rendering module 1204. In embodiments, audio processor 1010 may include one or both of AGC module 1202 and spatial rendering module 1204. Audio processor 1010 of FIG. 12 is described as follows.

When present, AGC module 1202 may be configured to perform automatic gain control such that the audio level (e.g., volume of speech) of different audio streams are relatively equalized when played at conference-enabled device 1000 (e.g., by loudspeakers 1014). For instance, AGC module 1202 may be configured to perform a step 1302 of a flowchart 1300 in FIG. 13. In step 1302, automatic gain control is performed on a first decoded audio signal to modify a volume of sound associated with the first decoded audio signal. For example, audio processor 1010 may determine that one or more of the audio signals (e.g., audio signals 1026a, 1026c, 1026d, 10260, includes a louder or quieter talker than others of the audio signals. As such, for improved listening quality, an amplitude of the audio signal having the louder talker may be reduced to reduce a volume of the louder talker. Additionally or alternatively, an amplitude of the audio signal having the quieter talker may be increased to increase a volume of the quieter talker. Techniques of AGC that may be implemented by AGC module 1202 will be known to persons skilled in the relevant art(s).

When present, spatial rendering module 1204 is configured to render audio of the conference call spatially, such that audio of each received selected audio stream may be perceived as being heard from a particular direction (angle of arrival). In such an embodiment, conference-enabled device 1000 may include and/or be coupled to multiple loudspeakers, such as a headset speaker pair, a home, office, and/or conference room multi-loudspeaker system (e.g., wall mounted, ceiling mounted, computer mounted, etc.), etc. The audio signals used to drive the multiple loudspeakers may be processed by spatial rendering module 1204 to render audio associated with each received selected audio stream in a particular direction. For example, spatial rendering module 1204 may vary a volume of audio associated with each received selected audio stream on a loudspeaker-by-loudspeaker basis to render audio for each received selected audio stream at a corresponding direction.

Persons skilled in the relevant art(s) will understand that one or more portions of processing can be moved from the conference server to the endpoint device(s) (or vice versa). For example, for a conference-enabled device that has two associated loudspeakers, processing up to and including spatial rendering can be performed in the conference server, and in such case, the conference server may transmit two audio streams that carry the stereo audio data. Although this scheme may be more complex for the conference server, and may suffer from the tandeming problem, it does enable spatial rendering of audio.

Figure 13:
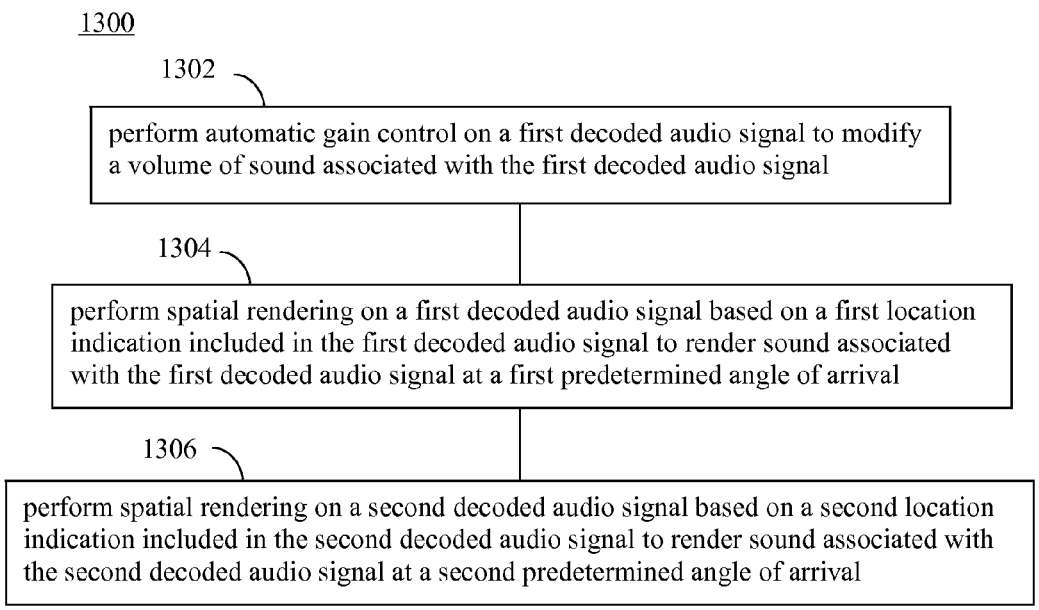
FIG. 13 shows various processes for processing audio signals, according to example embodiments.
Figure 14:
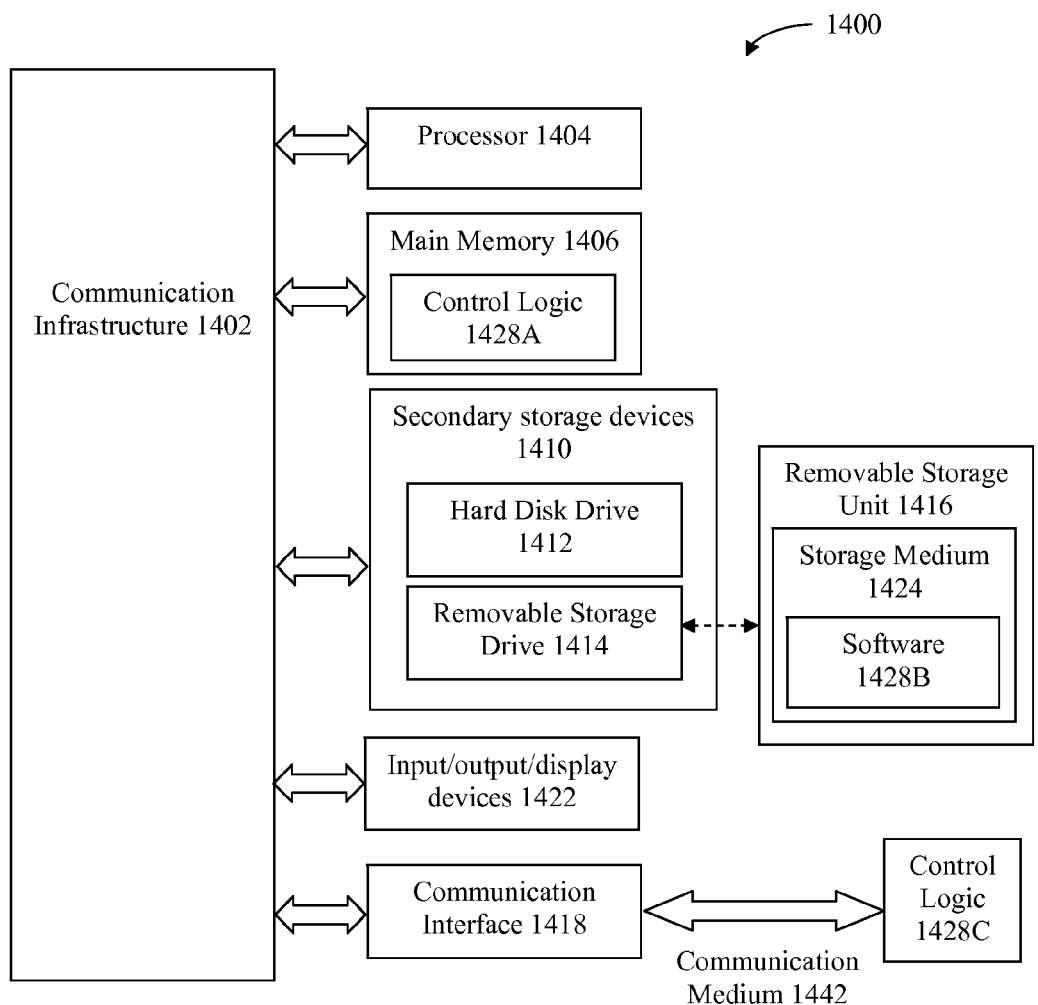
FIG. 14 shows a block diagram of an example computing device in which embodiments of the present invention may be implemented.

In an embodiment, spatial rendering module 1204 may be configured to perform steps 1304 and 1306 of flowchart 1300 in FIG. 13. In step 1304, spatial rendering is performed on a first decoded audio signal based on a first location indication included in the first decoded audio signal to render audio associated with the first decoded audio signal at a first predetermined angle of arrival. For instance, referring to FIG. 3, conference-enabled device 304a may include a location indication in one or more data packets (e.g., in a data packet header) in audio stream 306a that indicates a location of conference-enabled device 304a. The location indication may be an alphanumeric code and/or word(s), may be an IP address or other address associated with conference-enabled device 304a, and/or may be other indication that associates audio stream 306a with conference-enabled device 304a. Spatial rendering module 1204 may render audio associated with audio stream 306a that is broadcast by loudspeakers 1014 to be perceived by a user of conference-enabled device 1000 to be received from an angle of arrival associated with conference-enabled device 304a.

In step 1306, spatial rendering is performed on a second decoded audio signal based on a second location indication included in the second decoded audio signal to render sound associated with the second decoded audio signal at a second predetermined angle of arrival. For instance, similarly to conference-enabled device 304a, conference-enabled device 304c may include a location indication in one or more data packets in audio stream 306c that indicates a location of conference-enabled device 304c. The location indication may be an alphanumeric code and/or word(s), may be an IP address or other address associated with conference-enabled device 304c, and/or may be other indication that associates audio stream 306c with conference-enabled device 304c. Spatial rendering module 1204 may render audio associated with audio stream 306c that is broadcast by loudspeakers 1014 to be perceived by a user of conference-enabled device 1000 to be received from an angle of arrival associated with conference-enabled device 304c, that is different from the angle of arrival associated with conference-enabled device 304a and other conference participants.

The angles of arrival associated with conference-enabled devices 304a and 304c may be randomly selected by spatial rendering module 1204, or may be selected according to a predetermined scheme (e.g., a West coast located conference-enabled device 304 is rendered to the left, an East coast located conference-enabled device 304 is rendered to the right, a Midwestern located conference-enabled device 304 is rendered to the center, etc.). By rendering audio played at conference-enabled device 1000 at different directions to indicate the different conference call talkers, a listener at conference-enabled device 1000 is better enabled to discern which conference participants are talking at any particular time, improving the overall conference call experience.

Spatial rendering module 1204 may be configured to use techniques of spatial audio rendering, including wave field synthesis, to render audio at desired angles of arrival. According to wave field synthesis, any wave front can be regarded as a superposition of elementary spherical waves, and thus a wave front can be synthesized from such elementary waves. For instance, in the example of FIG. 10, spatial rendering module 1204 may modify one or more audio characteristics (e.g., volume, phase, etc.) of one or more of loudspeakers 1014 to render audio at desired angles of arrival. Techniques for spatial audio rendering, including wave field synthesis, will be known to persons skilled in the relevant art(s).

In step 906, the decoded audio signals are combined to generate a combined audio signal. For example, as shown in FIG. 10, audio stream combiner 1012 receives processed audio signals 1028a-1028n. Audio stream combiner 1012 is configured to combine audio streams 1028a-1028n to generate combined audio signal 1030. In the current example, audio stream combiner 1012 receives processed audio signals 1028a, 1028c, 1028d, and 1028f, which are combined in combined audio signal 1030. As such, combined audio signal 1030 includes audio information from each of audio streams 306a, 306c, 306d, and 306f. Audio stream combiner 1012 may be configured to aggregate processed audio signals 1028a-1028n to generate combined audio signal 1030 in any manner, including by adding processed audio signals 1028a-1028n, etc. In an embodiment, audio stream combiner 1012 may include a digital-to-analog (D/A) converter to generate combined audio signal 1030 in analog form. Combined audio signal 1030 may have any form, and may include multiple channels (e.g., one or more of a left front channel, a right front channel, a left surround channel, a right surround channel, a center channel, a right rear channel, a left rear channel, etc.).

In step 908, the combined audio signal is provided to at least one loudspeaker to be converted to sound to be received by a user of the first conference-enabled device. For example, as shown in FIG. 10, loudspeakers 1014 receive combined audio signal 1030. Loudspeakers 1014 broadcast sound generated from combined audio signal 1030, which may include voice from one or more conference participants of audio streams selected by conference server 302. When spatial rendering module 1204 is present, loudspeakers 1014 may broadcast sound in a manner that spatially localizes one or more of the conference participants.

IV. Example Device Implementations

Encoders 502a-502n, audio stream selector 504, decoders 506a-506n, audio stream combiners 508a-508n, voice activity detector 602, decoders 704a-704n, audio signal analyzer 706, A/D 1016, encoder 1006, decoders 1008a-1008n, audio processor 1010, audio stream combiner 1012, AGC module 1202, and spatial rendering module 1204 may be implemented in hardware, software, firmware, or any combination thereof. For example, encoders 502a-502n, audio stream selector 504, decoders 506a-506n, audio stream combiners 508a-508n, voice activity detector 602, decoders 704a-704n, audio signal analyzer 706, A/D 1016, encoder 1006, decoders 1008a-1008n, audio processor 1010, audio stream combiner 1012, AGC module 1202, and/or spatial rendering module 1204 may be implemented as computer program code configured to be executed in one or more processors. Alternatively, encoders 502a-502n, audio stream selector 504, decoders 506a-506n, audio stream combiners 508a-508n, voice activity detector 602, decoders 704a-704n, audio signal analyzer 706, A/D 1016, encoder 1006, decoders 1008a-1008n, audio processor 1010, audio stream combiner 1012, AGC module 1202, and/or spatial rendering module 1204 may be implemented as hardware logic/electrical circuitry.

The embodiments described herein, including systems, methods/processes, and/or apparatuses, may be implemented using well known computing devices/processing devices. For instance, a computer 1400 is described as follows, for purposes of illustration. In embodiments, conference-enabled devices 304, conference server 302, conference server 700, and/or conference-enabled device 1000 may each be implemented in one or more computer 1400. Relevant portions or the entirety of computer 1400 may be implemented in an audio device, a video game console, an IP telephone, and/or other electronic devices in which embodiments of the present invention may be implemented.

Computer 1400 includes one or more processors (also called central processing units, or CPUs), such as a processor 1404. Processor 1404 is connected to a communication infrastructure 1402, such as a communication bus. In some embodiments, processor 1404 can simultaneously operate multiple computing threads.

Computer 1400 also includes a primary or main memory 1406, such as random access memory (RAM). Main memory 1406 has stored therein control logic 1428A (computer software), and data.

Computer 1400 also includes one or more secondary storage devices 1410. Secondary storage devices 1410 include, for example, a hard disk drive 1412 and/or a removable storage device or drive 1414, as well as other types of storage devices, such as memory cards and memory sticks. For instance, computer 1400 may include an industry standard interface, such a universal serial bus (USB) interface for interfacing with devices such as a memory stick. Removable storage drive 1414 represents a floppy disk drive, a magnetic tape drive, a compact disk drive, an optical storage device, tape backup, etc.

Removable storage drive 1414 interacts with a removable storage unit 1416. Removable storage unit 1416 includes a computer useable or readable storage medium 1424 having stored therein computer software 1428B (control logic) and/or data. Removable storage unit 1416 represents a floppy disk, magnetic tape, compact disk, DVD, optical storage disk, or any other computer data storage device. Removable storage drive 1414 reads from and/or writes to removable storage unit 1416 in a well known manner.

Computer 1400 also includes input/output/display devices 1422, such as monitors, keyboards, pointing devices, etc.

Computer 1400 further includes a communication or network interface 1418. Communication interface 1418 enables the computer 1400 to communicate with remote devices. For example, communication interface 1418 allows computer 1400 to communicate over communication networks or mediums 1442 (representing a form of a computer useable or readable medium), such as LANs, WANs, the Internet, etc. Network interface 1418 may interface with remote sites or networks via wired or wireless connections.

Control logic 1428C may be transmitted to and from computer 1400 via the communication medium 1442.

Any apparatus or manufacture comprising a computer useable or readable medium having control logic (software)

stored therein is referred to herein as a computer program product or program storage device. This includes, but is not limited to, computer 1400, main memory 1406, secondary storage devices 1410, and removable storage unit 1416. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for encoders 502a-502n, audio stream selector 504, decoders 506a-506n, audio stream combiners 508a-508n, voice activity detector 602, decoders 704a-704n, audio signal analyzer 706, A/D 1016, encoder 1006, decoders 1008a-1008n, audio processor 1010, audio stream combiner 1012, AGC module 1202, spatial rendering module 1204, flowchart 400, flowchart 800, flowchart 900, step 1102, and/or flowchart 1300 (including any one or more steps of flowcharts 400, 800, 900, and 1300), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

V. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a first conference-enabled device, comprising:
   receiving a plurality of audio streams associated with a conference call from a conference server, each audio stream of the plurality of audio streams including a corresponding encoded audio signal generated based on sound received at a corresponding conference-enabled device;
   decoding the plurality of audio streams into a plurality of decoded audio signals;
   performing signal processing on a decoded audio signal of the plurality of decoded audio signals to enable spatial rendering of the decoded audio signal;
   combining the decoded audio signals to generate a combined audio signal; and
   providing the combined audio signal to at least one loudspeaker to be converted to sound to be received by a user of the first conference-enabled device, said providing including:
   enabling sound associated with the decoded audio signal to be spatially perceived as being heard from a particular direction based on said spatial rendering.

2. The method of claim 1, wherein said receiving comprises:
   receiving the plurality of audio streams selected by the conference server from audio streams associated with a set of all conference-enabled devices that participate in the conference call except for the first conference-enabled device.

3. The method of claim 1, wherein said performing comprises:
   performing automatic gain control on a first decoded audio signal to modify a volume of sound associated with the first decoded audio signal.

4. The method of claim 1, wherein said performing comprises:
   performing spatial rendering on a first decoded audio signal based on a first location indication included in the first decoded audio signal to render sound associated with the first decoded audio signal at a first predetermined angle of arrival; and
   performing spatial rendering on a second decoded audio signal based on a second location indication included in the second decoded audio signal to render sound associated with the second decoded audio signal at a second predetermined angle of arrival.

5. A first conference-enabled device, comprising:
   at least one decoder that receives a plurality of audio streams associated with a conference call from a conference server, each audio stream of the plurality of audio streams including a corresponding encoded audio signal generated based on sound received at a corresponding remote conference-enabled device, the at least one decoder being configured to decode the plurality of audio streams into a plurality of decoded audio signals;
   a spatial rendering module configured to perform signal processing on a decoded audio signal of the plurality of decoded audio signals to enable spatial rendering of the decoded audio signal;
   an audio stream combiner configured to combine the decoded audio signals to generate a combined audio signal; and
   at least one loudspeaker that receives the combined audio signal, the at least one loudspeaker being configured to convert the combined audio signal to sound to be received by a user of the first conference-enabled device and to enable sound associated with the decoded audio signal to be spatially perceived as being heard from a particular direction based on said spatial rendering.

6. The first conference-enabled device of claim 5, wherein the audio streams received by the at least one decoder were selected by the conference server from audio streams associated with a set of conference-enabled devices that includes all conference-enabled devices that participate in the conference call except for the first conference-enabled device.

7. The first conference-enabled device of claim 5, further comprising:
an audio processor that implements the spatial rendering module to perform the signal processing.

8. The first conference-enabled device of claim 7, wherein the audio processor includes:
an automatic gain control (AGC) module configured to perform automatic gain control on a first decoded audio signal to modify a volume of sound associated with the first decoded audio signal.

9. The first conference-enabled device of claim 5, wherein the
spatial rendering module is further configured to perform spatial rendering on a first decoded audio signal based on a first location indication included in the first decoded audio signal to render audio associated with the first decoded audio signal at a first predetermined angle of arrival; and
wherein the spatial rendering module is configured to perform spatial rendering on a second decoded audio signal based on a second location indication included in the second decoded audio signal to render sound associated with the second decoded audio signal at a second predetermined angle of arrival.

10. A method in a conference server, comprising:
receiving a plurality of audio streams from a plurality of conference-enabled devices associated with a conference call, each audio stream including a corresponding encoded audio signal generated based on sound received at a corresponding conference-enabled device;
selecting two or more audio streams of the plurality of audio streams based upon an audio characteristic;
performing spatial rendering on at least one of the selected two or more audio streams to render audio associated with the at least one of the selected two or more audio streams to be perceived as being received from a particular direction when converted into sound; and
transmitting the two or more audio streams to a conference-enabled device associated with the conference call to be decoded into two or more decoded audio streams, and the two or more decoded audio streams to be combined into a combined audio signal, the combined audio signal being enabled to be converted into sound by at least one loudspeaker of the conference-enabled device to be received by a user.

11. The method of claim 10, wherein said selecting comprises:
selecting a predetermined number of two or more of the plurality of audio streams that include loudest voice of the plurality of audio streams.

12. The method of claim 10, wherein said selecting comprises:
partially decoding each audio stream of the plurality of audio streams into a corresponding partially decoded audio signal to form a plurality of partially decoded audio signals; and
analyzing each partially decoded audio signal of the plurality of partially decoded audio signals based upon the audio characteristic to select the two or more audio streams of the plurality of audio streams.

13. The method of claim 12, wherein said analyzing comprises:
analyzing a header of each of the plurality of partially decoded audio signals to determine indications of the audio characteristic for the plurality of partially decoded audio signals; and
comparing the indications of the audio characteristic to select the two or more audio streams of the plurality of audio streams.

14. The method of claim 10, wherein said selecting comprises:
fully decoding each audio stream of the plurality of audio streams into a corresponding fully decoded audio signal to form a plurality of fully decoded audio signals; and
analyzing each fully decoded audio signal of the plurality of fully decoded audio signals based upon the audio characteristic to select the two or more audio streams of the plurality of audio streams.

15. The method of claim 10,
wherein performing spatial rendering on at least one of the selected two or more audio streams includes performing spatial rendering on at least two of the selected audio streams and randomly selecting perceived angles of arrival for the at least two of the selected audio streams.

16. A conference server, comprising:
a communication interface that receives a plurality of audio streams from a plurality of conference-enabled devices associated with a conference call, each audio stream including a corresponding encoded audio signal generated based on sound received at a corresponding conference-enabled device;
an audio stream selector configured to select two or more audio streams of the plurality of audio streams based upon an audio characteristic; and
a spatial rendering module configured to perform spatial rendering on at least one of the selected two or more audio streams to render audio associated with the at least one of the selected two or more audio streams to be perceived as being received from a particular direction when converted into sound; and
wherein the communication interface is configured to transmit the two or more audio streams to a conference-enabled device associated with the conference call to be decoded into two or more decoded audio streams, and the two or more decoded audio streams to be combined into a combined audio signal, the combined audio signal being enabled to be converted into sound by at least one loudspeaker of the conference-enabled device to be received by a user.

17. The conference server of claim 16, wherein the audio stream selector includes:
a voice activity detector configured to select a predetermined number of two or more of the plurality of audio streams that include loudest voice of the plurality of audio streams.

18. The conference server of claim 16, further comprising:
at least one decoder configured to partially decode each audio stream of the plurality of audio streams into a corresponding partially decoded audio signal to form a plurality of partially decoded audio signals; and
wherein the audio stream selector includes an audio signal analyzer configured to analyze each partially decoded audio signal of the plurality of partially decoded audio signals based upon the audio characteristic to select the two or more audio streams of the plurality of audio streams.

19. The conference server of claim 18, wherein the audio signal analyzer is configured to analyze a header of each of the plurality of partially decoded audio signals to determine indications of the audio characteristic for the plurality of partially decoded audio signals, and to compare the indications of the audio characteristic to select the two or more audio streams of the plurality of audio streams.

20. The conference server of claim 16, further comprising:
at least one decoder configured to fully decode each audio stream of the plurality of audio streams into a corresponding partially decoded audio signal to form a plurality of fully decoded audio signals; and
wherein the audio stream selector includes an audio signal analyzer configured to analyze each fully decoded audio signal of the plurality of fully decoded audio signals based upon the audio characteristic to select the two or more audio streams of the plurality of audio streams.

21. The conference server of claim 16,
wherein the spatial rendering module is further configured to perform spatial rendering on at least two of the selected two or more audio streams and randomly select perceived angles of arrival of the at least two of the selected two or more audio streams.

* * * * *